Sept. 2, 1969    C. E. KRESS    3,465,217
DIGITALIZED SHAFT ROTATION DIRECTION CONTROL
Filed Feb. 26, 1965    3 Sheets-Sheet 1

INVENTOR.
CHARLES E. KRESS
BY
Moody and Phillion
ATTORNEYS

Sept. 2, 1969          C. E. KRESS          3,465,217
DIGITALIZED SHAFT ROTATION DIRECTION CONTROL
Filed Feb. 26, 1965                    3 Sheets-Sheet 2

CASE 1 – POSITIVE DIFFERENCE – ABSOLUTE VALUE $< \frac{2^N}{2} (=4)$ – CLOCKWISE ROTATION

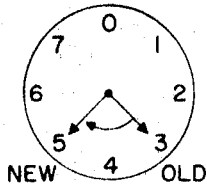

```
NEW POSITION     101
OLD POSITION     100  (1'S COMPLEMENT)
                 ───
                 001
END AROUND CARRY   1      FIG 3a
SUBTRACTOR OUTPUT 011
```

CASE 2 – NEGATIVE DIFFERENCE – ABSOLUTE VALUE $<4$ – COUNTER CLOCKWISE ROTATION

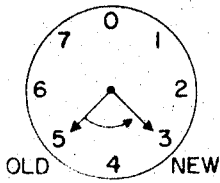

```
NEW POSITION     011
OLD POSITION     010  (1'S COMPLEMENT)
                 ───
                 101
END AROUND CARRY   0      FIG 3b
SUBTRACTOR OUTPUT 101
```

CASE 3 – POSITIVE DIFFERENCE – ABSOLUTE VALUE $>4$ – COUNTER CLOCKWISE ROTATION

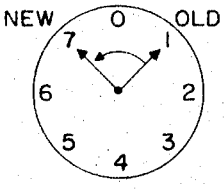

```
NEW POSITION     111
OLD POSITION     110  (1'S COMPLEMENT)
                 ───
                 101
END AROUND CARRY   1      FIG 3c
SUBTRACTOR OUTPUT 110
```

CASE 4 – POSITIVE DIFFERENCE – ABSOLUTE VALUE $>4$ – CLOCKWISE ROTATION

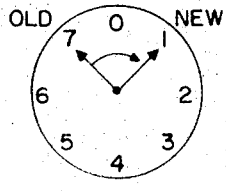

```
NEW POSITION     001
OLD POSITION     000  (1'S COMPLEMENT)
                 ───
                 001
END AROUND CARRY 000      FIG 3d
SUBTRACTOR OUTPUT 001
```

FIG 4

| DECIMAL DIFFERENCE | BINARY DIFFERENCE | INSTRUMENT ROTATION |
|---|---|---|
| -7 | 000 | CW |
| -6 | 001 | CW |
| -5 | 010 | CW |
| -4 | 011 | CW |
| -3 | 100 | CCW |
| -2 | 101 | CCW |
| -1 | 110 | CCW |
| 0 | 111 | CCW |
| 1 | 001 | CW |
| 2 | 010 | CW |
| 3 | 011 | CW |
| 4 | 100 | CCW |
| 5 | 101 | CCW |
| 6 | 110 | CCW |
| 7 | 111 | CCW |

INVENTOR.
CHARLES E. KRESS
BY
Moody and Phillips
ATTORNEYS

Sept. 2, 1969      C. E. KRESS      3,465,217

DIGITALIZED SHAFT ROTATION DIRECTION CONTROL

Filed Feb. 26, 1965      3 Sheets-Sheet 3

| FIG 5a | FIG 5b |
|---|---|
| NEW 101 | NEW 110 |
| OLD 011 | OLD 101 |
| 000 | 011 |
| CARRY 1 | CARRY 1 |
| 001 | 100 |

INVENTOR.
CHARLES E. KRESS

BY
Moodyard Phillion
ATTORNEYS

United States Patent Office 3,465,217
Patented Sept. 2, 1969

3,465,217
DIGITALIZED SHAFT ROTATION DIRECTION CONTROL
Charles E. Kress, Marion, Iowa, assignor to Collins Radio Company, Cedar Rapids, Iowa, a corporation of Iowa
Filed Feb. 26, 1965, Ser. No. 435,504
Int. Cl. H02p 1/54, 5/46, 7/68
U.S. Cl. 318—18                                6 Claims

ABSTRACT OF THE DISCLOSURE

A control circuit for rotating a shaft, whose position is digitally represented, to a new digitally represented position in the shortest arcuate path. The two binary numbers representing old and new positions are subtracted one from the other. The nature of the most significant bit of the difference determines the direction of the shortest arcuate path of shaft rotation from the old to the new position.

---

This invention relates generally to shaft positioning means and, more particularly, to means for rotating a shaft from one angular position to another through the minor arc path and employing digital coding tenchniques.

There are in the prior art many applications where a shaft must be rotated from one angular position to another. In many of these applications the shaft will be rotated through a number of complete cycles. For example, in the case of a motor driven potentiometer it usually is necessary to cycle the driving shafts several times to run the movable contact of the potentiometer from one end thereof to the other. In such cases the direction of rotation of the motor is dictated, not by the shortest angular path of the motor shaft from one position to another, but by the direction of travel of the potentiometer movable contact. Thus, even if it were necessary to move the driving motor shaft only a short angular distance, less than the 360°, the direction of rotation would be predetermined.

In other applications, however, the change of position of the movable shaft is less than 360°, and it is unimportant in which direction the shaft is rotated to move from an old or present position to a next immediate position. In such cases it is desirable that the movable shaft rotate through the minor arc rather than the major arc in order to conserve time. A specific example where such an application is useful is in the case of an aircraft compass. For example, if the old reading is 5° in a heading indicator and the new reading is 355°, the shortest distance from the old reading to the new reading is in a counterclockwise direction. However, if the old reading is 355° and the new reading is 5°, the shortest angular path to the new position is in a clockwise direction. Such shortest path is referred to as the minor arc path.

A primary object of the present invention is to provide a means for selecting the shortest angular path (minor arc) in rotating a shaft from an old to a new angular position.

A second purpose of the invention is to provide a digital coding technique means for rotating a shaft from a given angular position to a new angular position through the shortest angular path.

A third object of the invention is the improvement of shaft positioning means, generally.

The invention is ordinarily used in combination with a driving motor, such as a step motor, having a rotatable shaft, indicating means for digitally indicating the position of the motor shaft and a motor control means responsive to appropriate signals to cause such shaft to selectively rotate by predetermined angular amounts in either direction, clockwise or counterclockwise.

In combination with the above-mentioned structure, there is provided a control circuit means which is responsive to a first digital code derived from said indicating means and representative of the old, i.e., present, position of the shaft and a second digital input code representative of the new, i.e., the next immediate, position of the shaft, to produce a pair of output signals. The first of these output signals simply directs the motor to run, and the second of said output signals determines the angular direction in which the motor is to rotate. In the case of the present invention, such direction is through the mirror arc.

The control circuit means basically is a structure which subtracts the digital code representing the old position from the digital code representing the new position. It might be noted that the code representing both new and old positions are in binary form. However, since actual subtraction of one binary from another requires rather complex circuit means, such subtraction is accomplished by changing the number to be subtracted, i.e., the subtrahend, to its "1's" complement and then adding the two digital codes together. Thus, the control circuit means, in a preferred form of the invention, is a full added with an end around carry. As will be seen later herein, the nature of the most significant bit of the adder output determines the direction of rotation of the motor shaft. More specifically, if the most significant bit of the full adder output is a "1" the minor arc path is counterclockwise. On the other hand, if the most significant bit of the full adder output is a "0," the minor arc path is clockwise.

Since the digital code representing the new position of the shaft is added in its "1's" complement form of the digital code representing the old position of the shaft, coincidence between the two digital codes will occur when the output of all stages of the full adder are "1's." Accordingly, logic circuit is employed which causes the motor to run at all times, except when the outputs of all stages of the full adder are "1's."

The above-mentioned and other objects and features of the invention will be more fully understood from the following detailed description thereof when read in conjunction with the drawings:

FIG. 3 is a series of charts showing different examples of moving the rotatable shaft from one position to another;

FIG. 4 is a truth table showing all possible angular movements;

Figure 1:
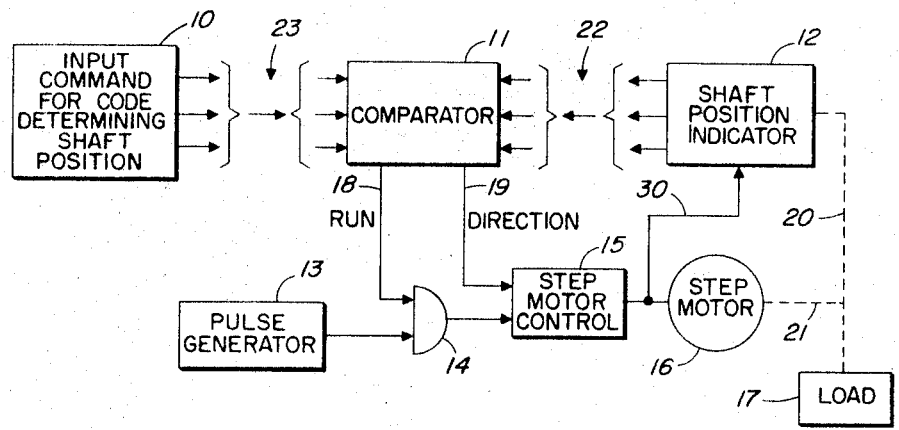
FIG. 1 is a block diagram of the type system in which the invention is ordinarily employed.

Referring now to FIG. 1, the step motor functions, when energized, to drive a load 17, which load may be a meter with an indicator which sweeps around an angular distance of 360° or less, such as, for example, a heading indicator for an aircraft. The step motor 16 is of a type which rotates in steps of discrete angular increments in response to pulses supplied thereto. The pulses supplied to step motor 16 are generated by pulse generator 13 and are supplied to motor 16 through AND gate 14 and a step motor control circuit 15.

It can be seen from FIG. 1 that pulses are supplied to the step motor 16 from source 13 only when a run command signal is present on lead 18 from comparator 11. Additionally, the direction of rotation of step motor 16 is determined by the polarity of the signal on the output lead 19 from comparator 11. Step motor control 15 is constructed to respond both to the direction control signal on lead 19 and to the output of AND gate 14 to supply control signals in accordance therewith directly to the windings of step motor 16.

Coupled to output shaft 21 of step motor 16 through a mechanical coupling means 20 is a shaft position indicator 12, which can be a code wheel, which are well known in the art. Alternatively, the shaft position indicator 12 can be a two-way counter, i.e., a counter which will count forwards and backwards in response to pulses supplied thereto through lead 30 from motor control circuit 15, and thus will keep a current count indicative of the actual position of the output shaft 21.

When it is desired to step the output shaft 21 of step motor 16 to a new position, an input command code is supplied from source 10 to comparator 11. Such input code is, in the present invention, in the form of a binary code, as is the output of shaft position indicator 12. The comparator 11 compares the two codes and from such comparison determines, firstly, that the shaft must move to a different position from the one it presently occupies; and, secondly, determines in which direction the shaft must rotate in order to travel the minor arc to the new position.

Figure 2:
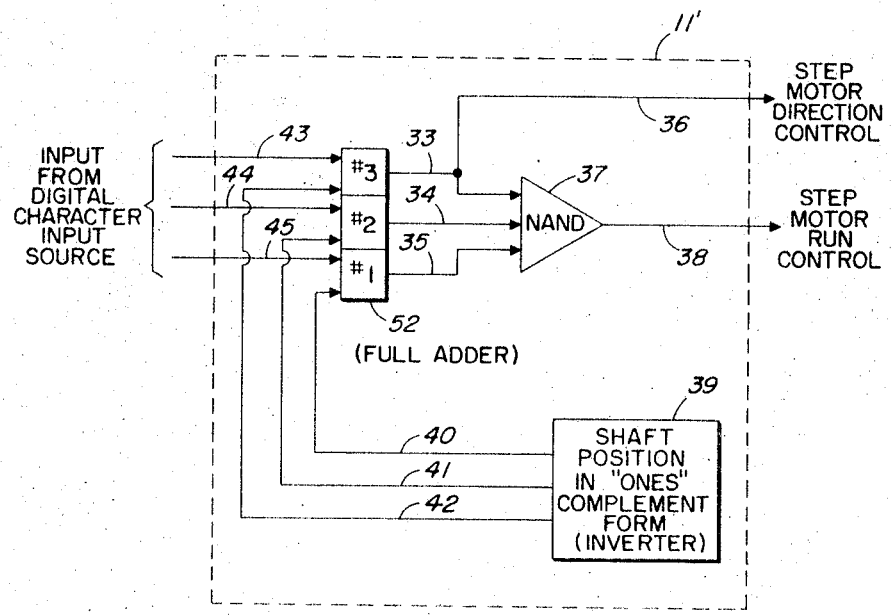
FIG. 2 is a block diagram of a portion of FIG. 1 and specifically shows a diagram of the control circuit means of FIG. 1, which control circuit compares the two digital coded signals to produce the signals for controlling the step motor.

Referring now to FIG. 2 there is shown a block diagram of logic which may be employed in the comparator 11 of FIG. 1. In FIG. 2 there is provided a full adder 52 and also an inverter 39 for inverting the output of the shaft position indicator 12 of FIG. 1. The inverter 39 is provided to produce the "1's" complement of the digital signal representing the actual position of the step motor output shaft.

Both the "1's" complement of the shaft position indicating signal and the input command signal are supplied to full adder 52 with the proper data bits being supplied to the proper stages of said full adder. More specifically, the output lead 40 from the "1's" complement producer 39 contains the least significant bit and is supplied to the stage #1 of the full adder. Similarly, the least significant bit of the input command code is supplied to the stage #1 of full adder 52 through input lead 45.

There are two outputs from the comparator 11'. One of these outputs is designated as lead 36 and is connected directly to stage #3 of full adder 52, which stage contains the most significant bit. As will be seen later, the direction of rotation of the motor is either clockwise or counterclockwise, depending upon whether the logic bit on lead 36 is a "1" or a "0." The second output lead from comparator 11' is lead 38 and indicates to the motor whether it should run at all. The polarity of the signal on lead 38 depends on the data contained in all three stages of full adder 52. More specifically, if the outputs of all stages of full adder contain a logic "1," the NAND gate 37 will respond thereto to produce an output signal indicating to the motor that it should not run, since coincidence between the desired position of the shaft and the actual position of the shaft has occurred. Under all other conditions coincidence has not occurred and the output of the NAND gate 37 will indicate to the motor that it should run in the direction indicated by the signal on output lead 36.

Figure 5:
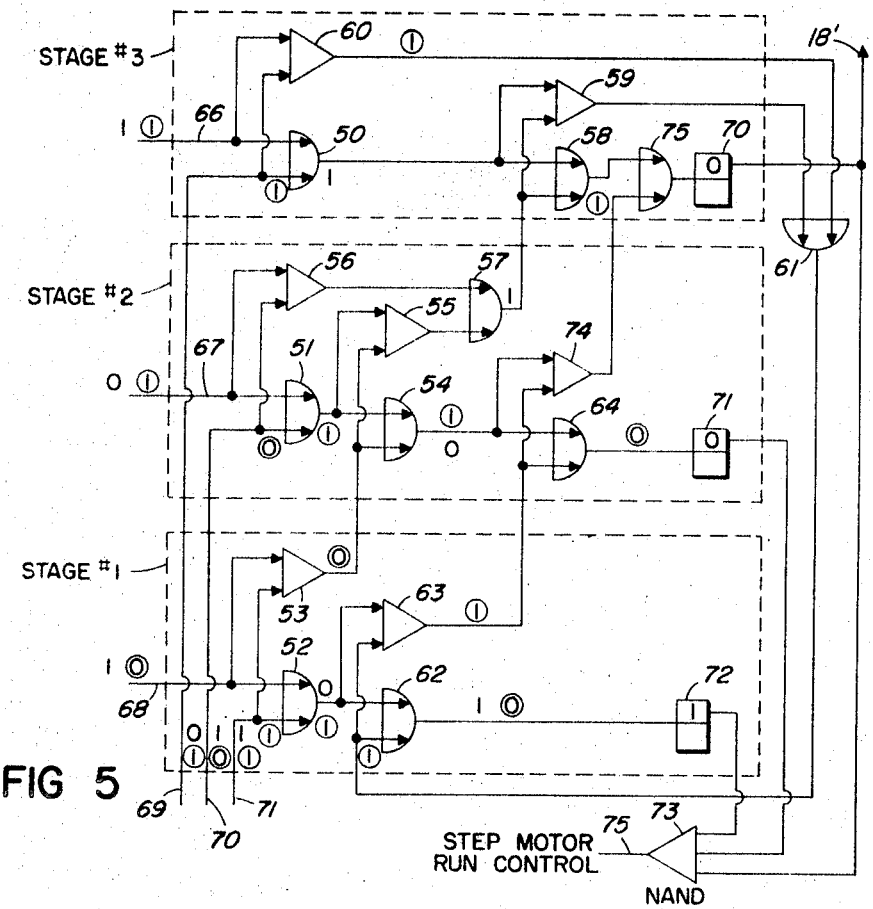
FIG. 5 is a block diagram of a full adder.

A more detailed block diagram of the comparator is shown in FIG. 5. However, before explaining the block diagram of FIG. 5, which is a full adder, reference will be made to the charts of FIGS. 3 and 4 which illustrate the mathematical relationship upon which the structure is based.

In the operation of the device, all possible situations must fall into one of four categories. That is to say, the difference between the binary number representing the desired new position and the binary number representing the present, or old, position of the shaft will fall into one of four different categories regardless of what the two binary digits are.

It is to be understood that in the particular example given in the drawings, it is assumed that the shaft has eight positions, which is represented by $2^n$, where $n$ is the number of binary bits required to represent the maximum number of positions of the shaft. In the present case where such maximum number of positions is eight, $n=3$.

The four different categories mentioned above are as follows:

(1) Where the difference between the two binary numbers is positive and has an absolute value less than half the number of the maximum possible positions of the shaft, i.e., <4.

(2) Where the difference is negative and the absolute value is less than half the number of the maximum positions of the shaft.

(3) Where the difference is positive and the absolute value is greater than half the maximum possible number of shaft positions.

(4) Where the difference is negative and the absolute value is greater than half the maximum number of shaft positions.

The four categories listed above are represented by specific examples in FIGS. 3a, 3b, 3c, and 3d, respectively. In FIG. 3a, for example, it is assumed that the old position of the shaft is position No. 3, represented by the binary number 011, and that the new position is 5, represented by binary number 101. However, as discussed hereinbefore, the binary digit representing the old position is used in its "1's" complement form in the addition process to permit such addition process in lieu of actual subtraction. Thus, the binary digit representing the old position will be 100 in FIG. 3a. Adding the binary digit 100 to the binary digit 101, with an end around carry, results in an output binary digit of 011, with the zero representing the most significant bit. With the presence of the logic "0" as the most significant bit position, the full adder output indicates that the minor arc is in a clockwise direction as evidenced by the illustration in FIG. 3.

In FIG. 3b the old position and the desired new position are reversed so that the desired new position is position 3 and the old or present position is position 5. In the computation in FIG. 3b the complement of the binary digit representing the old position is added to the binary word representing the new position, with the result, after an end around carry of zero, of a binary sum 101. In this case the most significant bit is a logic "1," indicating that the minor arc is in a counterclockwise direction.

Using the same process, it can be seen that in the case of FIG. 3c the most significant bit position of the adder output is a logic "1," indicating that a counterclockwise rotation is the minor arc path. In the case of FIG. 3d the most significant bit position of the adder output is a logic "0," indicating that the minor arc path is in the clockwise direction.

In FIG. 4 there is a truth table showing all the situations which are possible with an 8-position structure. The column at the extreme left entitled "DECIMAL DIFFERENCE" illustrates the sum of the new position and the "1's" complement of the old position in decimal numerals. The center column entitled "BINARY DIFFERENCE" shows this same difference in the binary system; and the column on the right entitled "INSTRUMENT ROTATION" shows the direction of rotation the shaft must take to travel the minor arc from the old to the new position.

Referring now to FIG. 5, there is shown a logic diagram of a full adder which can be used in the comparator circuit 11 of FIG. 1. It is to be understood that the full adder of FIG. 5 is only one of several type adders which could be used for this purpose. For example, as an alternative, two half adders with end around carry could be employed successfully in the invention rather than the structure actually shown in FIG. 5.

In FIG. 5 it is assumed that the binary code command for the new position of the shaft is supplied to leads 66, 67, and 68 and that the binary code representing the old or present position of the shaft is supplied to leads 69, 70, and 71. The corresponding bits of both binary characters are supplied to exclusive OR gates 50, 51, and 52, where OR gate 52 receives the least significant bits and OR gate 50 receives the most significant bits.

Assume that the command representing the new position is a binary word 101 and that the binary word representing the present position is 011, where the last bit (to the right) is the least significant bit.

Before describing the operation of the circuit of FIG. 5, a brief description of the various logic circuits shown therein will be given. A mutually exclusive OR circuit is one in which a logic "1" output is produced if only one of the inputs has a logic "1" supplied thereto. However, if both inputs have a logic "1" or a logic "0" supplied thereto, then the output of the mutually exclusive OR is a logic "0." In FIG. 5 elements 50, 51, 52, 54, 57, 58, 64, and 62 are mutually exclusive OR circuits.

An AND gate as defined herein is a circuit in which a logic "1" output is produced only if logic "1's" are supplied to all inputs of the AND gate. In the circuit of FIG. 5 elements 53, 56, 60, 63, 55, 59, and 74 are AND gates. Blocks 71 and 72 are flip-flop circuits to record and store the individual bits constituting the sum of any two binary numbers added in the full adder. NAND gate 73 is responsive to any condition of the bistable devices 70, 71, and 72, except where a logic "1" is contained in all three of said binary devices to produce a signal to the step motor to cause said motor to operate. Only when all three of the bistable devices 70, 71, and 72 contain a logic "1" will the output of the NAND gate be such as to cause the motor to stop running.

Turning again to a specific example of the operation of the circuit of FIG. 5, logic "1's" are supplied to both input leads of mutually exclusive OR gate 52, thus producing a logic "0" at the output thereof. However, AND gate 53 is responsive to the logic "1's" supplied to both inputs thereof to produce a logic "1" carry, which in turn is supplied to mutually exclusive OR gate 54 of stage #2.

At the same time, however, a logic "0" and a logic "1" have been supplied to OR gate 51 of stage #2, as shown in FIG. 5. By definition, a logic "1" will be produced at the output of OR gate 51. Thus, the mutually exclusive OR gate 54 will have a logic "1" supplied to both leads thereof and will produce a logic "0" at its output. Such logic "0" is supplied to OR gate 64 and the effect thereof will be discussed later in connection with the end around carry from stage #3.

There are two conditions when a carry will be effected from stage #2 to stage #3. The first of these two conditions is when logic "1's" are supplied to both the input leads of OR gate 51. The second of the two conditions is when a logic "1" appears at the output of OR gate 51 and also at the output of the carry AND gate 53 of stage #1. AND gates 56 and 55 of stage #2 are provided to produce logic "1" carriers to stage #3 when either of the two aforementioned carry conditions are met. For example, when both inputs of OR gate 51 have logic "1" supplied thereto, AND gate 56 will supply a logic "1" to OR gate 57, which is not necessarily a mutually exclusive OR gate; although a mutually exclusive OR gate would operate successfully at that point in the circuit.

Similarly, AND gate 55 will supply a logic "1" to OR gate 57 when logic "1's" are supplied to both inputs of AND gate 55.

At this point of the operation then, stage #2 has a logic "0" at the output of OR gate 54 and the stage #1 has a logic "0" at the output of OR gate 52, as shown in the figure. Further, a logic "1" carry is supplied through AND gate 55 and OR gate 57 to mutually exclusive OR gate 58 of stage #3.

Supplied to the inputs of OR gate 50 are a logic "1" and a logic "0", which will, by definition, supply a logic "1" to the other input of OR gate 58. Thus OR gate 58 has logic "1's" supplied to both its inputs and will supply a logic "0" to flip-flop 70.

AND gates 60 and 59 of stage #3 perform functions which are substantially identical to the functions of AND gates 56 and 55 of stage #2. More specifically, there are two possible conditions under which an end carry from stage #3 to stage #1 will occur. One of these conditions occurs when logic "1's" are supplied to both inputs of OR gate 50. In such a case AND gate 60 will supply a logic "1" through OR gate 61 and back to OR gate 62 of stage #1. The second situation in which a carry will occur is when logic "1's" appear at the output of OR gate 50 and also OR gate 57. In such a situation AND gate 59 will supply a logic "1" to OR gate 61 and back to OR gate 62 of stage #1.

In the particular example being discussed, a logic "1" appears on both inputs of AND gate 59, and such logic "1" is supplied to OR gate 62 of stage #1. Such logic "1" is an end around carry from the stage #3 to stage #1 and functions to produce a logic "1" of the output of mutually exclusive OR gate 62. The logic "1" at the output of OR gate 62 is stored in bistable device 72. AND gate 63 functions to provide a second carry from stage #1 to stage #2 in the event that such a carry is necessary as the result of the end around carry. In the particular example described, there is no carry from stage #1 to stage #2 through AND gate 63, since a logic "0" is applied to one of the input leads of AND gate 63.

However, if "1's" had been supplied to both inputs of AND gate 63, then a logic "1" would be produced at the output thereof and supplied to mutually exclusive OR gate 64 which, in turn, would produce a logic "1" output which bistable device 71 would store. However, in the actual example, the output of OR gate 64 is a logic "0" so that the bistable device 71 also contains a logic "0".

Although in the particular example set forth above, there is no second carry from stage #2 to stage #3, there would be such a carry in certain examples as will be discussed below. Such a carry which would be as a result of the end around carry from stage #3 to stage #1. The second carry from stage #2 to stage #3 is effected by means of AND gate 74 which is responsive to logic "1's" on both inputs thereof to supply a logic "1" to OR gate 75, which can be a mutually exclusive OR gate or, alternatively, a simple OR gate. The output of OR gate 75 would then be a "1," assuming the other input would have a logic "0" applied thereto, so that the binary device 70 would also contain a logic "1."

In the actual example used, however, the binary devices 70, 71, and 72 contain, respectively, the logic bits "0," "0," and "1," which are supplied to NAND gate 73. Since all such logic bits are not "1's," the output of NAND gate 73 will command the step motor to step. The particular direction the step motor is to step is determined by the logic bit contained in binary device 70.

FIG. 5a shows the binary addition and carry utilized in the specific example described in the immediately preceding paragraph. In FIG. 5b there is shown an addition of binary digits representing new and old positions of the shaft in which there is not only an end around carry, but also in which the end carry continues on through the three stages. The actual logic "1's" or "0's" that would appear at the outputs of the various elements of FIG. 5 are shown near the output terminals thereof in a circled manner to differentiate from the outputs that occur in the case of the example of FIG. 5a.

Figure 6:
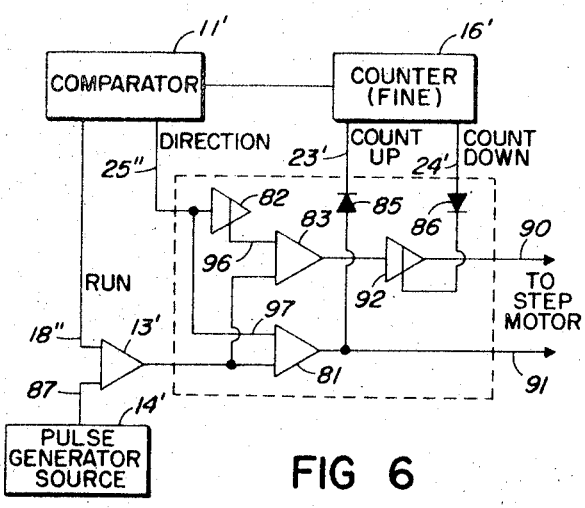
FIG. 6 is a block diagram showing how the output signals of the control circuit means (comparator) are utilized to control the step motor.

Referring now to FIG. 6, there is shown a block diagram of the control circuit corresponding to the block 15 of FIG. 1. In FIG. 6 the two outputs of the comparator 11' are, respectively, the direction-indicating signal and the motor-energizing signal, which two signals occur, respectively, on leads 25" and 18".

The run-indicating signal is supplied to AND gate 13' along with the output of pulse generator source 14', which is supplied to AND gate 13' through lead 87.

The output from AND gate 13' is then supplied to the two AND gates 83 and 81 which are connected in parallel and are instructed to respond to logic "1's" in input leads 96 and 97 thereof to pass pulses from the AND gate 13'. Such output pulses from AND gates 83 and 81 are of a positive plurality, let it be assumed. However, the output of AND gate 83 has an inverter 92 therein which converts such positive pulses to negative pulses. The output from AND gate 13' is then supplied to the two AND gates 83 and 81 which are connected in parallel, and are constructed to respond to logic "1's" on both inputs thereof to produce logic "1" outputs. However, AND gate 83 has an inverter 92 in its output which converts the logic "1" output of AND gate 83 into a logic "0." The negative and positive signals appearing on output leads 90 and 91 are supplied to step motor 16 of FIG. 1 to cause it to rotate in either a clockwise or counterclockwise direction.

The polarity of the pulses supplied to step motor is determined by the polarity of the pulse on the output lead 25" of comparator 11'. More specifically, if the direction-indicating pulse is a logic "1," gate 81 will be energized to produce positive output pulses therefrom. The inverter 82 will function to invert the logic "1" output so that a logic "0" is supplied to one of the inputs of gate 83, thus effectively blocking gate 83. Consequently, the motor will rotate in a clockwise direction.

If a logic "0" appears on the direction-indicating lead 25", AND gate 81 will be blocked, but the AND gate 83 will be opened due to the effect of inverter 82. Thus, positive pulses will appear at the output of lead 83 which will be inverted to negative pulses by inverter 92 and supplied to the step motor to cause it to rotate in a counterclockwise direction.

Diodes 85 and 86 are oppositely poled and are connected, respectively, from the outputs of AND gates 81 and 83 to counter 16'. The said counter 16' is a conventional counter constructed to count forwards or backwards depending upon whether positive or negative pulses are supplied thereto through the leads 23' and 24'. Thus, since the same negative and positive pulses that are caused to rotate the step motor are also supplied to counter 16', the said counter 16' will maintain a count which is representative of the angular position of the step motor.

The output of the counter 16 is supplied to comparator 11' which, as has been discussed hereinbefore, will function to compare said digital representation of the present position of the motor shaft position with the digital command calling for a new angular position of said shaft.

It is to be understood that the form of the invention shown and described herein is but a preferred embodiment thereof and that various changes may be made in circuit arrangement and, particularly, in the detailed logic thereof, without departing from the spirit or the scope of said invention.

I claim:

1. In a system comprising shaft means rotatable into successive predetermined angular positions through angular distances less than 360°, direction control means for determining the direction of the minor arc path between any present shaft position and any desired new shaft position, said direction control means comprising:
   first means responsive to the present angular position of said shaft means to produce a first binary coded signal indicative of said present angular position;
   input means for supplying a second binary coded signal indicative of the desired angular position of said shaft means;
   comparator means for determining the difference between said first and second binary coded signals;
   said comparator means having N stages where $2^N$ equals the total number of angular positions of said shaft means, and with each stage comparing bits of comparable order of magnitude of said first and second binary coded signals;
   the state of the comparator stage which compares the most significant bits of said first and second binary coded numbers being indicative of the direction of the minor arc path of said shaft means to said new position.

2. A system in accordance with claim 1 in which said comparator means comprises:
   inverting means for inverting one of said binary coded signals;
   binary adding means comprising N stages for adding the uninverted binary coded signal to the inverted binary coded signal to produce in the most significant stage of said binary adding means a signal indicative of the direction of the minor arc path to the new shaft position;
   and gating means responsive to the condition of all the stages of said binary adding means when said two binary coded signals do not bear a predetermined relation to each other, to produce a signal indicating that said shaft means should rotate to a new position.

3. A system in accordance with claim 1 in which said comparator means comprises:
   means for producing the 1's complement of said first binary coded signal;
   binary adding means comprising N stages for adding the 1's complement of said first binary coded signal to said second binary coded signal to produce, in the stage of said binary adding means containing the most significant bit, a logic bit indicative of the direction of the minor arc path to the new shaft position;
   and gating means responsive to the condition of all the stages of said binary adding means, when said 1's complement of said first binary coded signal and said second binary coded signal do not bear a predetermined relation to each other, to produce a signal indicating that said shaft means should rotate to a new position.

4. In a system for positioning a shaft through angular rotations of less than 360° and including:
   first means responsive to the present angular position of said shaft to produce a binary coded signal representative of said present angular position;
   and input means for supplying a second binary coded signal representative of the desired new angular position of said shaft;
   comparator means having N stages where N equals the number of bits in said first and second binary coded signals;
   said comparator means being constructed to compare the said first and second binary coded signals and to determine the difference therebetween;
   said comparator means being constructed to produce a binary bit "1" or a binary bit "0" in the stage thereof containing the most significant bit to indicate the direction of the minor arc path from any present to any desired position of said shaft.

5. A system in accordance with claim 4 in which said comparator means comprises:
   means for inverting one of said binary coded signals;
   binary adding means comprising N stages for adding the uninverted binary coded signal to the inverted binary coded signal to produce, in the most significant stage of said binary adding means, a signal indicative of the direction of the minor arc path to the new shaft poistion;
   and gating means responsive to the condition of all the stages of said binary adding means to produce a signal indicating that said shaft should rotate to a new position when said two binary coded signals do not bear a predetermined relation to each other.

6. A system in accordance with claim 4 in which said comparator means comprises:

means for producing the 1's complement of said first binary coded signal;

binary adding means comprising N stages for adding the 1's complement of said first binary coded signal to said second binary coded signal to produce, in the stage of said binary adding means containing the most significant bit, a logic bit indicative of the direction of the minor arc path to the new shaft position;

and gating means responsive to the condition of all the stages of said binary adding means, when said 1's complement of said first binary coded signal and said second binary coded signal do not bear a predetermined relation to each other, to produce a signal indicating that said shaft should rotate to a new position.

References Cited

UNITED STATES PATENTS

| 2,823,344 | 2/1958 | Ragland | 318—28 XR |
| 2,823,345 | 2/1958 | Ragland et al. | 318—28 XR |
| 3,045,157 | 7/1962 | Jacquet et al. | 318—28 |
| 3,182,240 | 5/1965 | Schmid | 318—28 |
| 2,989,680 | 6/1961 | Weiser et al. | 318—467 |

B. DOBECK, Primary Examiner

U.S. Cl. X.R.

318—28, 162